Figure 1:
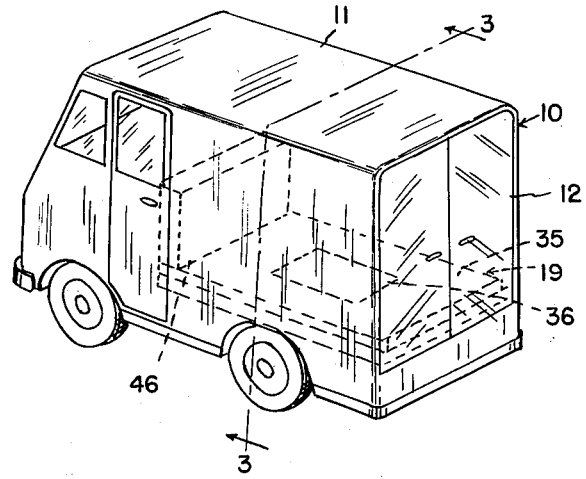

May 2, 1961 R. E. LOWE 2,982,578
MOBILE CATERING TRUCK EQUIPMENT
Filed May 18, 1956 2 Sheets-Sheet 1

INVENTOR.
ROY E. LOWE
BY
ATTORNEYS

May 2, 1961 R. E. LOWE 2,982,578
MOBILE CATERING TRUCK EQUIPMENT
Filed May 18, 1956 2 Sheets-Sheet 2

INVENTOR.
ROY E. LOWE
BY
ATTORNEYS

United States Patent Office

2,982,578
Patented May 2, 1961

2,982,578
MOBILE CATERING TRUCK EQUIPMENT
Roy E. Lowe, 12612 E. Jefferson Ave., Detroit 14, Mich.

Filed May 18, 1956, Ser. No. 585,638

5 Claims. (Cl. 296—22)

My invention relates to mobile catering trucks and more particularly to a self-contained cafeteria-type service structure adapted to extend out of the catering truck and equipped for serving hot lunches.

Catering trucks and carts are used extensively today and constitute an increasing volume of the business in quick lunch service in industrialized areas.

The need for more efficient and more complete service has arisen over the years, and caterers have expressed a need for improved equipment to meet rising competition. Primarily the catering trucks are not equipped to handle hot lunches, other than providing hot sandwiches and coffee. In addition, such hot sandwiches as there are must be stored in cabinets which use canned heat, and it is found that these are not too efficient, the sandwiches on the bottom perhaps being burned while those on top are soggy and only lukewarm. Coffee which is brewed at the central office and stored in the truck's coffee urns, warmed by canned heat, may have a stale taste and be lukewarm.

Also, in managing trucks heretofore the operator would merely drop the side panels of the truck and stand back to collect as the customers crowd around trying to serve themselves. This results in inefficient operation and lost time in serving the customer, which deficiencies are directly attributable to the nature of the truck construction.

A recognition of these faults and a realization that in which a competitive business substantial improvement in service was warranted lead to this invention.

In particular, an object of the invention is to improve general operation of catering trucks by providing a mobile cafeteria table adapted to be carried in a truck and operable to be extended therefrom for more orderly food service.

Another object of the invention is to achieve more efficient control of catering truck operation by providing a truck with an extendable cafeterial type table having a central opening in which an operator may stand while serving food.

A further object of the invention is to improve the quality and variety of lunches available from catering trucks by providing a means for serving regular hot meals cafeteria style from a table extended out of the truck body.

Yet another object of the present invention is to provide improved heating means for food serving equipment in a catering truck by constructing a serving table adapted to extend from the truck and having regulatably heated equipment supplied from a fuel container carried by the table.

A still further object of the invention is to provide an improved catering truck by constructing runners on the floor of the truck and a cafeteria type table slidably supported on the runners for readily being extended out of the truck, said table being preferably partially supported by the truck when extended.

Figure 3:
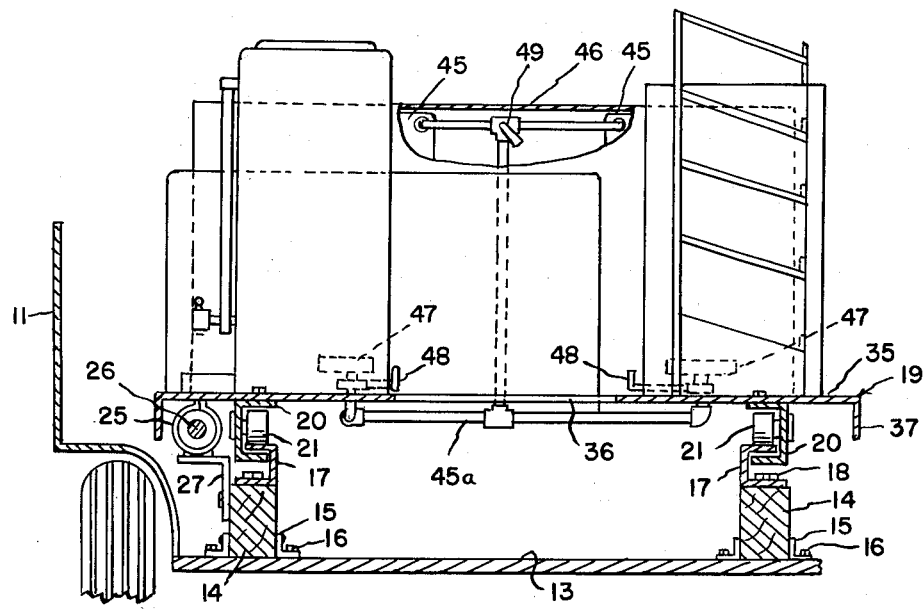
Figure 2:
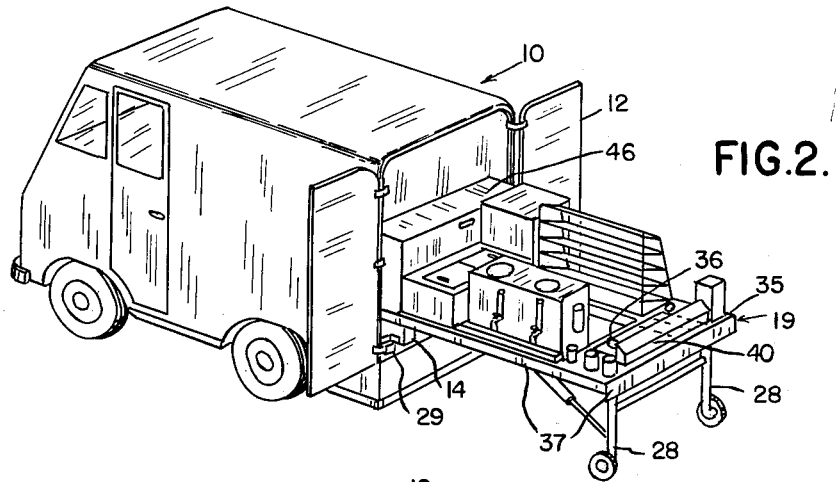
Figure 4:
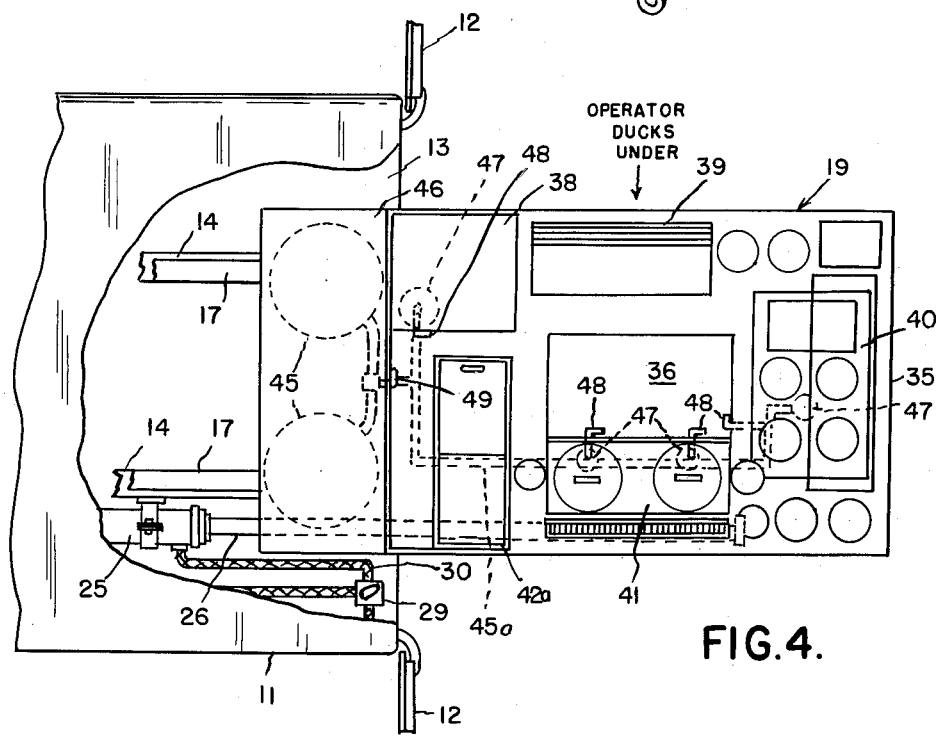

For a more complete understanding of the invention, reference may be had to the accompanying drawings illustrating a preferred embodiment of the invention in which like characters refer to like parts throughout the several views and in which Fig. 1 is a perspective view of a preferred type of catering truck with the table shown by dotted outline within the body of the truck, Fig. 2 is a perspective view of the same truck with the rear doors open, the serving table extended, and the outer supporting legs down, Fig. 3 is a section through the table and truck taken substantially on the line 3—3 of Fig. 1, and Fig. 4 is a top plan view of the extended table and a fragmentary portion of the truck.

A preferred delivery type motor vehicle 10 is illustrated as having a body structure 11 provided with rear doors 12 and a floor 13, although it will be apparent that the invention may be adapted to other types of vehicles and other door arrangements.

A pair of support members 14 are longitudinally removably secured to the truck floor 13 by any desired means such as brackets 15 and bolts 16, and a channel runner 17 is preferably bolted by bolts 18 to the upper surface of each support member 14 as shown in Fig. 3. A serving table structure 19 is provided on the underside with longitudinal roller channels 20 to each of which are secured a set of rollers 21. The rollers 21 rest on the upper sides of the channel runners 17, thereby slidably supporting the table structure 19 within the truck, the runner and roller channels engaging as shown to prevent relative lateral movement of the table structure 19.

When the truck doors are open, the table structure 19 may be rolled out manually or by any desired means, one preferred type of which is illustrated as comprising a pneumatic or hydraulic cylinder 25 and ram piston 26. The cylinder may be secured by a bracket 27 to the support member 14 and the piston may be secured to the table by structure 19 by any means. As the table structure 19 extends, a pair of wheeled support legs 28 are preferably adapted to be lowered and locked into position for supporting the outer end of the table structure 19 on the ground, as shown in Fig. 2. A control valve 29 for controlling air or oil pressure flow to the cylinder 25 through conduits 30 may be conveniently mounted inside the truck, as in Fig. 4.

The preferred cafeteria type serving table structure 19 shown in the drawings comprises a stainless steel table top 35 having a substantially centrally located cutout opening 36 for a serving operator to stand, and flange edges 37. Various food and drink storage and dispensing equipment are carried by the sides and outer end of the table top 35; such equipment as food warmer cabinet 38, a pastry display case 39, a steam table 40, a coffee urn 41, a refrigerating chest 42, and/or any other desired equipment. The steam table 40 is preferably set into a cutout opening in the table top 35.

Fuel supply tanks 45 are carried by the inner end of the table structure 19, preferably being enclosed in a cabinet 46, riding with the table when it is extended but preferably adapted to remain within the interior of the truck body 11, as shown in Fig. 4, so that the weight need not be on the table legs 28. Some of the equipment, such as the food warmer 38, steam table 40, and coffee urn 41 are provided with burners 47, which are supplied with fuel, preferably bottled gas such as butane, from the fuel supply tanks 45 through pipes 45a which may be arranged in any desired way, preferably extending under the table top 35, and controls 48 may be provided for regulation by the operator. If a plurality of tanks 45 are used, a control 49 may be provided for switching from one tank 45 to the other.

The several advantages and the adaptability of my invention may readily be seen. The equipment being arranged along the sides and outer end of the table permit patrons to move in orderly fashion around from area to area, and the operator standing in the opening 36 is able to assist and serve them as well as keep control of equipment. The presence of an operator in the center also permits the utilization of the steam table 40 from which may be individually served a variety of hot meals and soup. Heretofore such cafeteria type steam tables have proved impractical because there was no effective way to serve from them, and because standard fueled burners were not readily utilized. With the present construction, the fuel tanks and pipes are carried by the table itself, so there is no problem of tangling lines as there might be if the fuel tanks were mounted in the truck. Also, by using such fuel, a more effective means is available for uniformly regulating the heat in the warmer 38, and coffee may be brewed in the coffee urn 41 as the truck is being moved between stops, thereby providing on-the-spot fresh coffee which heretofore has not been available.

It should also be noted that the idea of providing a vehicle with an extending table structure as described may readily be adapted to practically any type of vehicle and to a variety of uses by providing a selectively extendable table or platform structure carried by the vehicle floor in which case access to the articles or materials to be transported by the vehicle and loaded on said platform structure may be readily obtained by extending said platform structure on which they are supported. Thus loading and unloading of any vehicle may be more rapidly accomplished than is normally possible when the track is unloaded through a door, particularly in the case of long trucks and similar mobile equipment.

All the foregoing illustrates the fact that this invention provides a vast improvement over existing catering truck equipment, and although I have described but one preferred embodiment of my invention, it will be apparent to one skilled in the art to which the invention pertains that various changes and modifications may be made therein without departing from the spirit of the invention or the scope of the appended claims.

I claim:

1. A portable cafeteria vehicle assembly for dispensing food and drink and comprising a body housing structure, a serving table structure carried within said body housing structure and selectively extendable in a substantially horizontal plane from said vehicle, means supporting the extended end of the table structure on the ground and the inner end thereof supported by said vehicle, said serving table structure having a substantially centrally located operator's opening enabling the operator to stand on the ground when the table is extended, food and drink serving equipment carried on the sides and the ground supported end of said table structure, said equipment including regulatable heating units, fuel supply means carried by the end of the table supported by said body housing structure and disposed substantially therein at all times, and means conducting fuel from said supply means to said heating units.

2. A mobile cafeteria vehicle assembly comprising a closed body housing structure provided with a door opening and a door closure for same, a serving table structure slidably supported in said body housing structure and selectively extendable in a substantially horizontal plane out of said vehicle door opening, means selectively supporting the outer end of said extended table on the ground and the inner end thereof supported by said vehicle, said table structure having a substantially centrally located operator's opening and carrying food and drink serving equipment on the sides and the outer extended end, said equipment provided with regulatable heating units, fuel supply means carried solely by the inner end of said table structure and disposed within said body housing structure at all times, and regulatable means carried only by said table structure for conducting fuel from said supply means to said heating units.

3. A portable cafeteria vehicle assembly comprising a body housing structure, a self-contained unitary serving table structure selectively entirely enclosed within said body housing structure while said vehicle assembly is being transported from place to place, means adjustably supporting said table structure and mounted in said body housing structure, said supporting means having supporting elements providing for selectively substantially horizontal adjustment of said table structure to an extended position whereby the major portion thereof may be selectively disposed exteriorly of the body housing structure, food and drink dispensing equipment, heating means carried by said table structure for said equipment to facilitate preparing and heating food and drink, said equipment being fully operable when completely contained within said body housing structure and when disposed in an extended position with respect to said body housing structure in readiness for rendering service, said table structure having a central opening about which said food and drink dispensing equipment is disposed, said central opening serving to provide a central area for accommodating the operator in easy ready access to all said equipment.

4. A cafeteria vehicle assembly comprising a panel truck having a floor, a roof and side panels defining and enclosing a load compartment, a serving table, means movably securing said table to the floor of said panel truck and operable to permit extension of said table in a substantially horizontal plane from said compartment, means limiting the extending travel of said table whereby to provide means supporting the inner end portion of said table by said truck, adjustable ground engaging jacks carried by said table and supporting the extending table portion, food and drink serving equipment carried on top of said table, said table and equipment carried thereby being retractable within said load compartment and being located relative to said side panels and said roof to provide for complete housing of said table and equipment when retracted and for head room clearance with respect to the roof to thereby provide for ready access to said table and equipment from without the vehicle when so retracted, said food and drink serving equipment being arranged on said table to be disposed exteriorly of said load compartment when said table structure is fully extended, said equipment including regulatable heating units, fuel supply means carried by the inner end of said table and arranged to be disposed within said load compartment at all times, and means conducting fuel from said supply means to said heating units.

5. A cafeteria vehicle assembly comprising a body housing structure provided with an enclosed load compartment, a serving table carried within said compartment and selectively extendable in a substantially horizontal plane from said compartment, means supporting the extended end of the table on the ground and means supporting the inner end of the table at all times by said body housing structure and at all times within said compartment, food and drink serving equipment carried on the portion of the table which extends out of said compartment, said equipment including regulatable heating units disposed exteriorly of said compartment when said table is extended, fuel supply means carried by the inner end of said table and arranged to be disposed within said compartment at all times for full support at all times by said body housing structure, and means conducting fuel from said supply means to said heating units.

References Cited in the file of this patent

UNITED STATES PATENTS

| 302,844 | Hoffman | July 29, 1884 |
| 780,265 | Closson | Jan. 17, 1905 |

(Other references on following page)

UNITED STATES PATENTS

| | | | |
|---|---|---|---|
| 1,170,711 | Trombley | Feb. 8, | 1916 |
| 1,285,304 | Merrill | Nov. 19, | 1918 |
| 1,436,984 | Follett | Nov. 28, | 1922 |
| 1,513,357 | Webber | Oct. 28, | 1924 |
| 1,654,330 | Jenkins | Dec. 27, | 1927 |
| 2,249,845 | Mitchell | July 22, | 1941 |
| 2,284,419 | Greig | May 26, | 1942 |
| 2,490,014 | De V. Brand | Dec. 6, | 1949 |
| 2,493,236 | Dunstan | Jan. 3, | 1950 |
| 2,643,395 | Stassinos | June 30, | 1953 |
| 2,771,318 | Jagsch | Nov. 20, | 1956 |
| 2,784,027 | Temp | Mar. 5, | 1957 |

FOREIGN PATENTS

| | | | |
|---|---|---|---|
| 1,014,110 | France | May 21, | 1952 |